United States Patent [19]

Ellis

[11] Patent Number: 4,684,249
[45] Date of Patent: Aug. 4, 1987

[54] ANGULAR POSITION SENSORS

[75] Inventor: Stafford M. Ellis, West Sussex, England

[73] Assignee: GEC Avionics Limited, England

[21] Appl. No.: 719,287

[22] Filed: Apr. 3, 1985

[30] Foreign Application Priority Data

Apr. 9, 1984 [GB] United Kingdom ............... 8409146

[51] Int. Cl.$^4$ .................... G01B 11/26; G01C 3/00
[52] U.S. Cl. ......................................... 356/152; 356/1
[58] Field of Search .................................. 356/1, 152

[56] References Cited

U.S. PATENT DOCUMENTS

| 3,375,375 | 3/1968 | Abbey et al. | 356/152 |
| 4,193,689 | 3/1980 | Reymond et al. | 356/141 |
| 4,441,809 | 4/1984 | Dudley et al. | 356/1 |
| 4,475,814 | 10/1984 | Marche | 356/152 |
| 4,568,182 | 2/1986 | Modjallal | 356/1 |

FOREIGN PATENT DOCUMENTS 1465134 7/1974 United Kingdom .
1520154 2/1976 United Kingdom .

OTHER PUBLICATIONS

Proceedings of S.I.D., vol. 19(1978) 4th Quarter, No. 4, pp. 181–185.

Primary Examiner—Stephen C. Buczinski
Attorney, Agent, or Firm—Kirschstein, Kirschstein, Ottinger & Israel

[57] ABSTRACT

An angular position sensor for sensing the relative angular position of a helmet worn by a passenger in an aircraft with respect to the aircraft is disclosed. The sensor includes three spaced linear photodetector arrays fixed to the aircraft, and a light source mounted on the helmet and arranged to produce a light beam which rotates cyclically about an axis in the helmet so as to successively irradiate a photodetector within each array within each cycle. A sensor attached to the helmet produces a time datum signal during each cycle. A computer uses the location within the arrays of the irradiated photodetectors, and the relative timing of the irradiations with respect to the time datum to provide the required azimuth, elevation and roll angles of the helmet.

12 Claims, 6 Drawing Figures 4,684,249

ANGULAR POSITION SENSORS

BACKGROUND OF THE INVENTION

1. Field of the Invention

This invention relates to angular position sensors.

In particular the invention relates to angular position sensors adapted to produce outputs which are a measure of the relative angular position of two bodies, one body normally defining a co-ordinate reference frame.

DESCRIPTION OF RELATED ART

One particular application of such sensors is in so-called helmet sight systems. Such systems detect the line of sight of an observer, typically an aircraft pilot, from a measurement of the position of a helmet worn by the observer. In conjunction with appropriate control means such a system may be used to enable a pilot to direct a weapon or other device, e.g. a camera, towards a target simply by looking at the target.

A known helmet sight system comprises two infrared sources connected to the aircraft structure which each generate a thin fan shaped beam which is rotated such that the cockpit area is flooded with infra-red light. A pair of detectors on each side of the pilot's helmet produce pulses each time a beam passes over the helmet. The spatial orientation of the detectors is then determined by triangulation using the known distance between detectors, and the time of arrival of the detector pulses. Azimuth and pitch angles for the helmet may then be determined. Such a sight is described in Proceedings of the S.I.D., volume 19, No. 4, 1978 pages 181-185.

Such a known helmet sight suffers the disadvantages however, that ambient light within the cockpit makes it difficult for the detectors to detect the presence of the relatively weak infra-red light. Furthermore the sight does not generally measure the roll angle.

SUMMARY OF THE INVENTION

It is an object of the invention to provide an angular position sensor wherein these disadvantages may be overcome.

According to a first aspect of the present invention an angular position sensor for sensing the relative angular position of first and second bodies comprises: three spaced linear photodetector arrays fixed with respect to said first body; means fixed with respect to said second body for producing a light beam which executes a cyclic sweeping motion about an axis defined within said second body, such that said light beam successively irradiates a photodetector within each array during each cycle of its sweeping motion; means attached to said second body for producing a time datum signal within each cycle of motion of said light beam; means for determining the locations within the arrays of the irradiated photodetectors, means for determining the timing of said irradiations with respect to said time datum signals; and means responsive to said locations and said timing to develop an output representative of the relative angular position of said first and second bodies.

According to a second aspect of the present invention an angular position signalling arrangement for use in a system for sensing the relative angular position of a vehicle framework and a helmet worn by a passenger in the vehicle comprises; a light source mounted on the helmet and operative to produce a light beam which executes a cyclic sweeping motion about an axis of a reference frame defined in the helmet, and a means attached to the helmet for producing a time datum signal within each cycle of motion of the light beam when the light beam has a predetermined angular position with respect to the reference frame.

BRIEF DESCRIPTION OF THE DRAWINGS

One angular position sensor in accordance with the invention forming part of a helmet sight system will now be described, by way of example, with reference to the accompanying drawing in which.

DETAILED DESCRIPTION OF THE PREFERRED EMBODIMENTS

Figure 1:
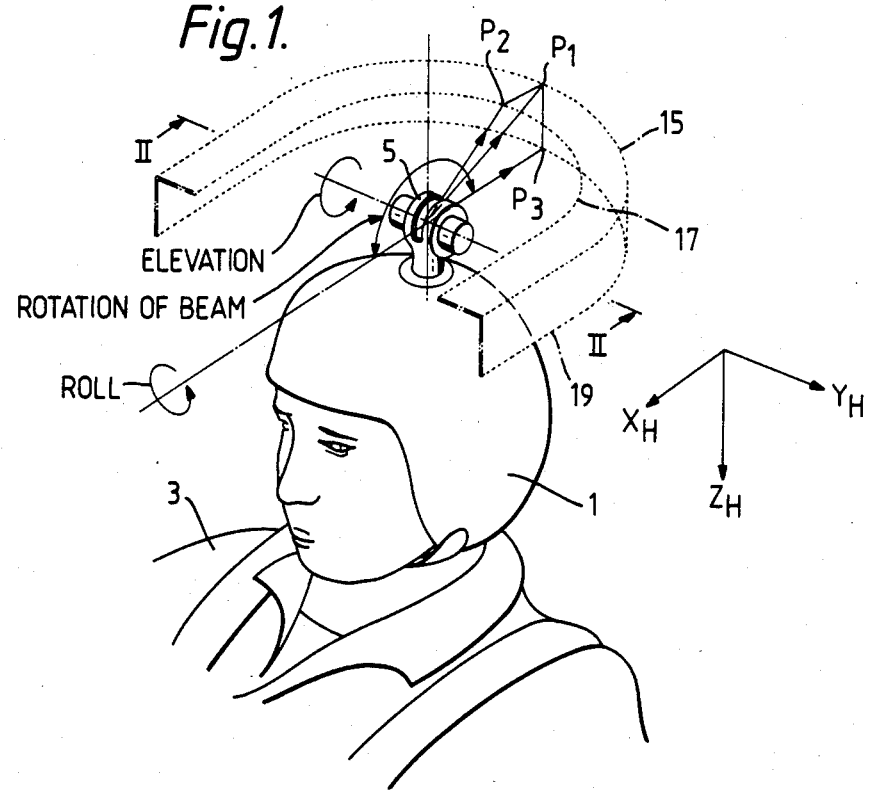
FIG. 1 is an overall view of the sensor.
Figure 2:
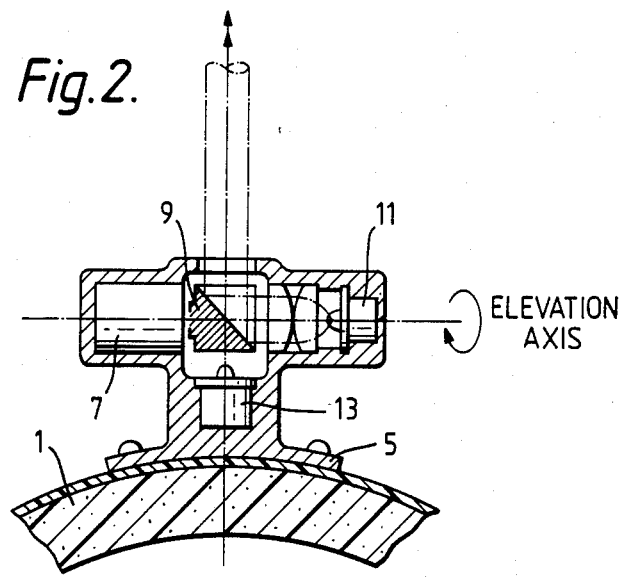
FIG. 2 is an enlarged sectional view along the line II—II in FIG. 1.

Referring firstly to FIGS. 1 and 2, the sensor provides electrical outputs providing an indication of the angular position of a helmet 1 worn by an aircraft pilot 3, with respect to a co-ordinate reference frame fixed with respect to the aircraft in which the pilot 3 is travelling. The helmet is provided with sighting means (not shown) operative in use to direct the pilot 3 to maintain his line of sight in a fixed, predetermined attitude with respect to the helmet 1, so that the sensor outputs are indicative of the angle of the line of sight of the pilot 3 in the co-ordinate reference frame.

The system includes a 'T' shaped structure 5 fixedly mounted on the top of the helmet 1. Inside one arm of the structure 5 there is a synchrous motor 7 arranged to rotate a mirror prism 9 in a cavity in the centre of the structure 5. Inside the other arm of the structure 5 is an infra-red source 11, arranged to direct a beam of infra-red light onto the prism 9, such that as the prism rotates, the beam rotates about the $Y_H$ axis of the helmet, i.e. in the $X_H Z_H$ plane as indicated in FIG. 1. The structure 5 also includes an infra-red sensor 13 arranged such that the beam is pointing downwards with respect to the helmet 1, i.e. along the $Z_H$ axis, it will irradiate the sensor 13. The system further includes three substantially semi-circular linear arrays 15, 17, 19 of photodiodes in spaced parallel relationship to each other. The arrays are attached via a support structure (not shown) to the cockpit of the aircraft, so as to be situated in close proximity to the structure 5, above and behind the pilot 3, the number N of photodiodes within each array being chosen in mind of the required accuracy of the system. The arrays 15 and 17 are positioned in the same plane centered about the same axis, with the array 17 having a smaller radius than the array 15, whilst the array 19 has the same radius as the array 15, and lies vertically under it in cockpit space. The three arrays 15, 17, 19 are positioned such that the beam irradiates at least one photodiode within each array as it rotates, the positions of the irradiated photodiodes within each array 15, 17, 19 being designated $P_1$, $P_2$, $P_3$ respectively.

Figure 3:
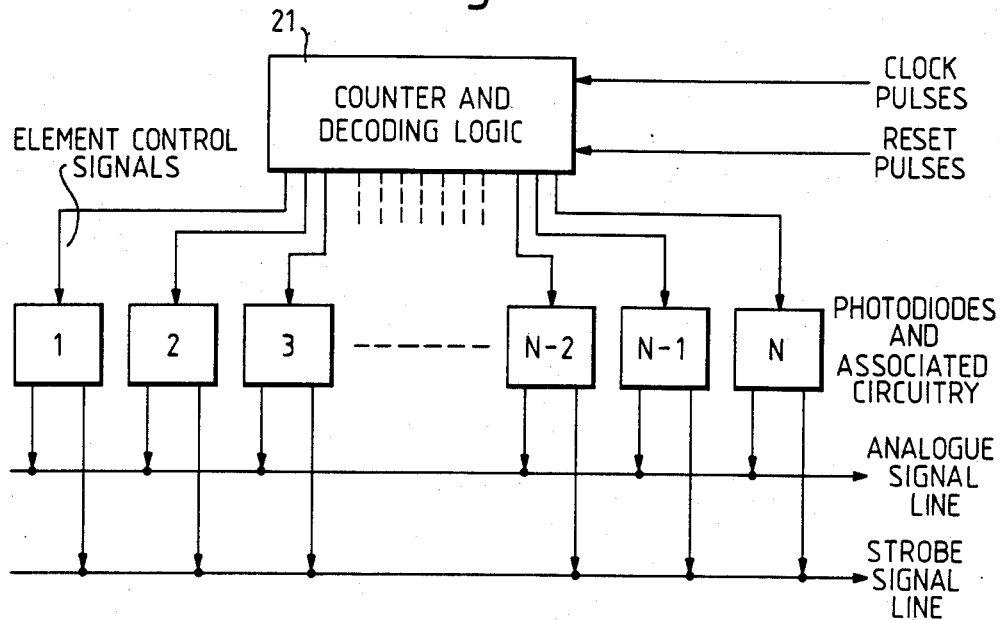
FIG. 3 is a block schematic diagram of one of the arrays of photodiodes incorporated in the sensor.
Figure 4:
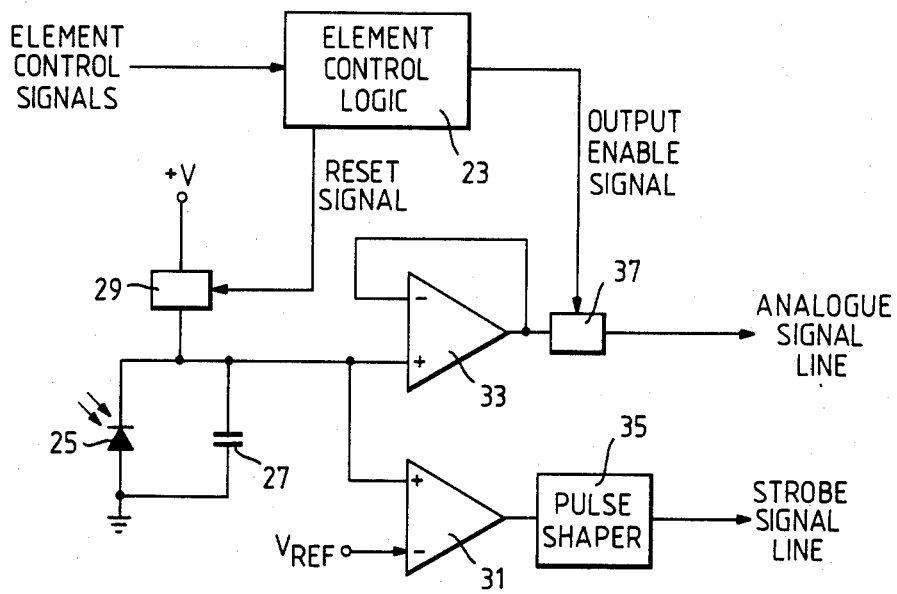
FIG. 4 is a circuit diagram of one of the photodiodes and associated circuitry shown in FIG. 3.
Figure 5:
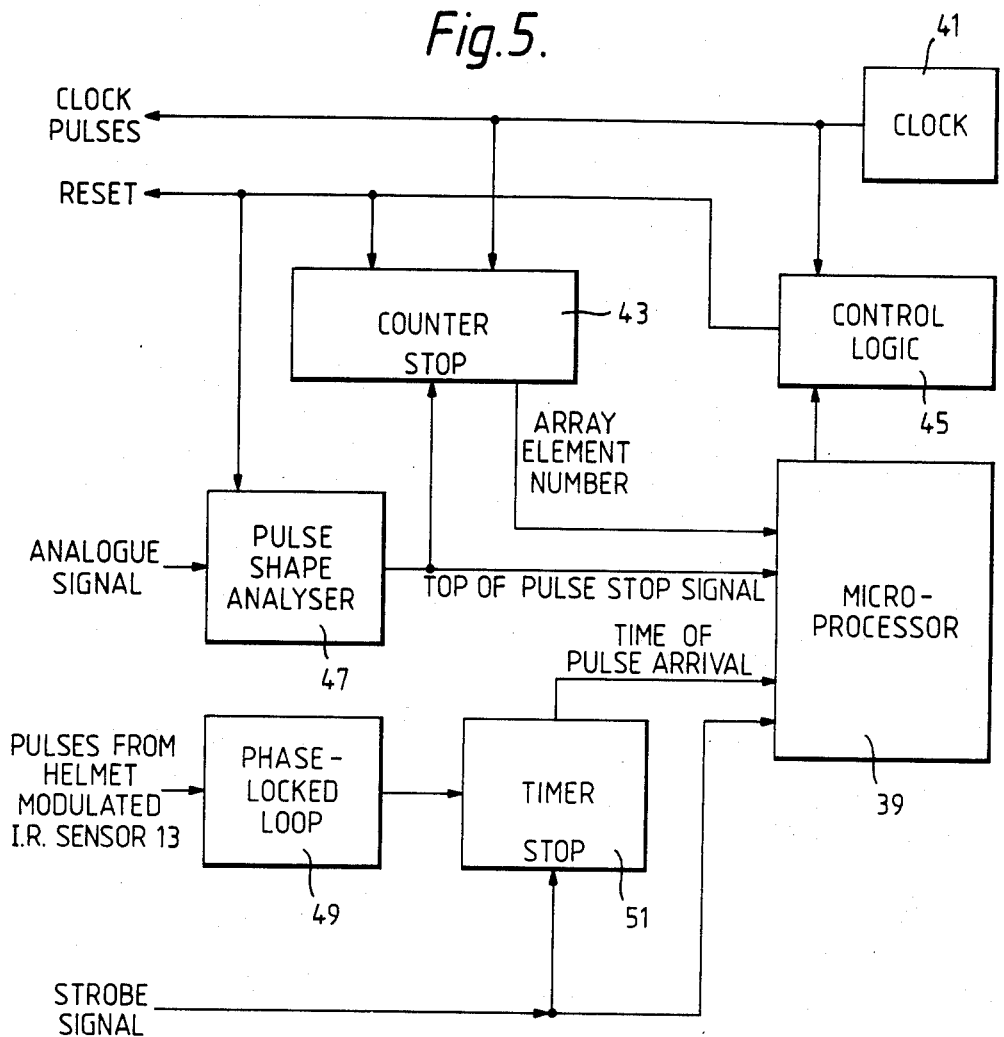
FIG. 5 is a block schematic diagram of the processing unit for handling the signals from one of the arrays of photodiodes.

Referring now also to FIGS. 3, 4 and 5, in respect of each array 15, 17, 19 there is provided a counter and decoding logic unit 21, which is connected via two input signal lines to a processing unit, one input line carrying clock pulses, and the other reset pulses. Referring now particularly to FIG. 4, the unit 21 provides parallel element control signals to element control logic circuits 23 each associated with a respective photodiode 25 of the arrays 15, 17 or 19 these circuits providing reset signals and output enable signals. Each photodiode 25 is connected across a capacitor 27, the parallel arrangement being connected between earth and a voltage +V via an electronic switch 29 responsive to the reset signals issued by the element control logic circuit 23. The potential difference across the capacitor 27 is monitored by two high input impedance amplifiers 31, 33. The first amplifier 31 acts as a comparator so as to generate a pulse, via pulse shaper 35, onto a strobe signal line which is connected to the circuitry of each photodiode as best seen in FIG. 3, when the potential difference reaches a level determined by a reference voltage $V_{REF}$. The second amplifier 33 is a buffer amplifier whose output is connected via an electronic switch 37 under the control of an output enable signal produced by the element control logic circuit 23 to an analogue signal line also connected to the circuitry of each photodiode.

Referring now particularly to FIG. 5, each of the three processing units operates under the general control of a microprocessor 39. Each unit includes a clock pulse generating means 41 which supplies clock pulses to the clock pulse signal line to the unit 21, a counter 43 and a control logic circuit 45. The circuit 45 in turn supplies reset signals to the reset pulse signal line to the unit 21, the counter 43 and a pulse shape analyser 47. The pulse shape analyser 47 is connected to the analogue signal line to produce an output which is supplied to the counter 43 and the microprocessor 39. A phase-locked loop circuit 49 is connected to the output from the infra-red sensor 13 within the structure 5 on the helmet 1, the output of the circuit 49 being connected to a timer 51, to which the strobe signal line is also connected.

In use of the system a reset signal pulse is issued simultaneously by each element control logic unit 23 causes the switch 29 to close allowing the capacitor 27 to charge up. After the end of the reset pulse, the switch 29 opens, the leakage of current from the capacitor 27 then being mainly determined by the light falling on the photodiode 25. The element, or elements within each array 15, 17, 19 which is or are irradiated by the infra-red beam as it rotates in the $X_H Z_H$ plane may then be indentified as follows. Irradiation by the infra-red beam of one or more of the photodiodes 25 within each array will cause the amplifier 31 to generate a strobe pulse onto the strobe signal line whose leading edge will be synchronised with the arrival of the light pulse on the photodiode 25, the amplitude of the monitored voltage being stored by the respective buffer amplifier 33, until an element control signal produced by the unit 21 causes the contents of each buffer amplifier 33 to be sequentially output onto the analogue signal line by control of the switch 37. Thus the processing unit is able to count the number of clock pulses issued in the counter 43, until a signal is detected on the analogue signal line and use this to determine which photodiodes were irradiated and to what extent. The microprocessor 39 then uses this information to determine which photodiode 25 within each array has been irradiated the most by the infra-red beam so as to determine the points $P_1$, $P_2$, $P_3$. The strobe pulse allows the time of arrival of the light pulse on the irradiated photodiode(s) to be determined by the timer 51 relative to the time datum provided by the pulse from the sensor 13 on the helmet 1. A subsequent reset pulse generated by the circuit 45 is then used to reset the counter 43, and reset all the array elements for the next cycle of the infra-red beam.

Calculation of the helmet's angular position with respect to the reference frame of the cockpit, from the data relating to which of the elements within each array were irradiated by the beam within a particular cycle, and the relative timing of these irradiations is performed by a computer (not shown) as follows:

The positions of the intersected photodetector elements within each array $P_1$, $P_2$, $P_3$ may be defined in cockpit space as $(X_1', Y_1', Z_1')$, $(X_2', Y_2', Z_2')$, $(X_3', Y_3', Z_3')$ respectively where the X axis points forward, the Y' axis to the right, and the Z' axis downwards. As the zero point of the cockpit is arbitrary, it is possible to shift this zero point to point $P_1$, such that the co-ordinates become: $(0,0,0)$ ; $(X_2'-X_1', Y_2'-Y_1', Z_2'-Z_1')$; $(X_3'-X_1', Y_3'-Y_1', Z_3'-Z_1')$ Thus for the particular configuration of the arrays 15, 17, 19 shown, where the pilot is looking straight ahead, with his head vertically up $$X'_1 = Y'_1 = Z'_1 = Z'_2 = 0$$

The computer proceeds to transform the X' Y' Z' coordinates into X Y Z coordinates in a new coordinate system defined by the two conditions that 1. the X Z plane contains all three points $P_1$, $P_2$, $P_3$ so that $Y_1, Y_2, Y_3 = 0$
2. $Z_2 = 0$ for any orientation of the helmet 1.

The transformation from X' Y' Z' to X Y Z is found in two steps. The first step is a transformation to X" Y" Z" by a rotation around the Z' axis by an angle $\eta$ $$X'' = X' \cos \eta + Y' \sin \eta$$

$$Y'' = -X' \sin \eta + Y' \cos \eta$$

$$Z'' = Z'$$

In order to make $Y''_2 = 0$ we need $$-X'_2 \sin \eta + Y'_2 \cos \eta = 0$$

hence $$\tan \eta = Y'_2 / X'_2 \qquad (1)$$

Using this $\eta$ the following coordinates are obtained

|       | X"    | Y"   | Z"   |
|-------|-------|------|------|
| $P_1$ | 0     | 0    | 0    |
| $P_2$ | $X''_2$ | 0    | 0    |
| $P_3$ | $X''_3$ | $Y''_3$ | $Z''_3$ |

A further rotation around the X" axis by an angle $\mu$ is used to make $Y_3 = 0$.

The transformation is $$X = X''$$

$$Y = Y'' \cos \mu + Z'' \sin \mu$$

$Z = Y'' \sin \mu + Z'' \cos \mu$

In order to get $Y_3=0$ we need $Y''_3 \cos \mu + Z''_3 \sin \mu = 0$ hence $$\tan \mu = -Y''_3/Z''_3 \qquad (2)$$

Using this the following coordinates are obtained

|    | X    | Y | Z   |
|----|------|---|-----|
| $P_1$ | 0    | 0 | 0   |
| $P_2$ | $X_2$ | 0 | 0   |
| $P_3$ | $X_3$ | 0 | $Z_3$ |

All three Y values are now 0, which proves that $P_1$, $P_2$, $P_3$ are in the X Z plane as required and that both $P_1$ and $P_2$ are on the X axis.

Thus the X, Y, Z co-ordinates are expressed in terms of the X', Y', Z' co-ordinates using the following relationship:

|   | X' | Y' | Z' |
|---|----|----|-----|
| X | $\cos \eta$ | $\sin \eta$ | 0 |
| Y | $-\sin\eta \cos\mu$ | $\cos\eta \cos\mu$ | $\sin\mu$ |
| Z | $\sin\eta \sin\mu$ | $-\cos\eta \sin\mu$ | $\cos\mu$ | these relationships defining the attitude matrix of the helmet 1.

Figure 6:
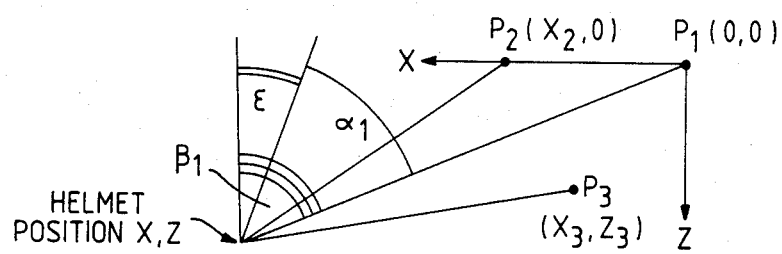
FIG. 6 is a diagram of a reference frame defined within the structure of an aircraft cockpit.

Referring now also to FIG. 6, the actual helmet co-ordinates within the reference frame X Y Z are a rotation $\epsilon$ round the Y axis. Angles $\alpha_1$, $\alpha_2$, $\alpha_3$ are subtended by the points $P_1$, $P_2$, $P_3$ with respect to the helmet in the X Y Z co-ordinate system defined herebefore, these angles being calculable quantities from the measured positions of the points $P_1$, $P_2$, $P_3$.

As can be seen in FIG. 6, an angle $\beta$ may be defined such that $$\beta = \epsilon + \alpha \qquad (3)$$

Thus from FIG. 6, $$\tan \beta_1 = X/Z, \tan \beta_2 = (X-X_2)/Z, \tan \beta_3 = (X-X_3)/(Z-Z_3) \qquad (4)$$

Defining $t_{21}$ and $t_{31}$ as $t_{21} = \tan(\alpha_2 - \alpha_1) = \tan(\beta_2 - \beta_1)$ $t_{31} = \tan(\alpha_3 - \alpha_1) = \tan(\beta_3 - \beta_1)$ and expanding $\tan(\beta_2 - \beta_1)$ and $\tan(\beta_3 - \beta_1)$ in terms of $\tan \beta_1$, $\tan \beta_2$ and $\tan \beta_3$ $t_{21} = (\tan \beta_2 - \tan \beta_1)/(1 + \tan \beta_2 \tan \beta_1)$ $t_{31} = (\tan \beta_3 - \tan \beta_1)/(1 + \tan \beta_3 \tan \beta_1)$ Thus, substituting the expressions given in (4)

$$t_{21} = \left( \frac{X - X_2}{Z} - \frac{X}{Z} \right) / \left( 1 + \frac{X(X - X_2)}{Z^2} \right)$$

$$t_{31} = \left( \frac{X - X_3}{Z - Z_3} - \frac{X}{Z} \right) / \left( 1 + \frac{X(X - X_3)}{Z(Z - Z_3)} \right)$$

which can be written $$t_{21}(X - X_2 + Z^2/X) = -Z X_2/X \qquad (5)$$

$$t_{31}(X - X_3 + (Z^2 - Z Z_3)/X) = Z_3 - Z X_3/X \qquad (6)$$

Multiplying (5) with $t_{31}/t_{21}$ and subtracting it from (6) we obtain $t_{31}(X_2 - X_3) - Z_3 = (-X_3 + X_2 t_{31} + Z_3 t_{31}) Z/X$ hence $$Z/X = A = \frac{t_{31}(X_2 - X_3) - Z_3}{X_2 t_{31}/t_{21} - X_3 + Z_3 t_{31}} \qquad (7)$$

Inserting this onto (5) we get $$t_{21}(X - X_2 + A^2 X) = -A X_2 \qquad (8)$$

$X t_{21}(1 + A^2) = X_2(t_{21} - A)$ $X = X_2 \dfrac{t_{21} - A}{t_{21}(1 + A^2)}$ Thus equations (3), (7), and (8) determine the helmet position and elevation in the co-ordinate system X Y Z which is rotated by an angle $\epsilon$ with respect to the helmet co-ordinate system $X_H Y_H Z_H$. It will readily be seen that the quantities $t_{21}$ and $t_{31}$ in equations (7) and (8) may be derived from the measured time intervals at which the beam irradiates the points $P_1$, $P_2$, $P_3$ together with the knowledge of the period of rotation of the beam, the angle $\epsilon$ being derived from the relationship $\epsilon = \beta_1 - \alpha_1$ where $\beta_1 = \arctan X/Z$.

In order to find the helmet position in cockpit coordinates we need the attitude matrix of the helmet multiplied with the rotation $\epsilon$ around the Y axis i.e.

$$(T) = \begin{pmatrix} \cos\epsilon & 0 & -\sin\epsilon \\ 0 & 1 & 0 \\ \sin\epsilon & 0 & \cos\epsilon \end{pmatrix} \begin{pmatrix} \cosh \eta & \sinh & 0 \\ -\sinh \cos\mu & \cosh \cos\mu & \sin\mu \\ \sinh \sin\mu & -\cosh \sin\mu & \cos\mu \end{pmatrix}$$

We find $T_{11} = \cos \epsilon \cos \eta - \sin \epsilon \sin \eta \sin \mu$ $T_{12} = \cos \epsilon \sin \eta + \sin\epsilon \cos \eta \sin \mu$ $T_{13} = -\sin \epsilon \cos \mu$ $T_{32} = \sin \epsilon \sin \eta - \cos \epsilon \cos \eta \sin \mu$ $T_{33} = \cos \epsilon \cos \mu$ Then the helmet positions are in cockpit coordinates $X' = X \cos\eta + Z \sin\eta \sin\mu + X'_1$ $Y' = X \sin\eta - Z \cos\eta \sin\mu + Y'_1$ $$Z' = Z \cos\mu + Z'_1 \qquad (9)$$

and the attitude angles are found from (T), the helmet azimuth angle $\psi$ being given by the relationship $$\tan \psi = T_{12}/T_{11} \qquad (10)$$

the helmet elevation angle $\theta$ being given by the relationship $$\sin \theta = -T_{13} \quad (11)$$

and the helmet roll angle $\phi$ being given by the relationship $$\tan \phi = T_{32}/T_{33} \quad (12)$$

It will be appraciated that whilst in the example described herebefore, the relevant positions of the light beam are detected by photodiodes, other forms of photodetector may be used. For example each element position within the arrays 15, 17, 19 may contain the end of an optical fibre, the other end of which is connected to a photoresponsive area of a charge coupled device.

It will also be appreciated that many other mutual orientations and positions of the three arrays 15, 17, 19 other than the one described by way of example are possible.

I claim:

1. An angular position sensor for sensing the relative angular position of first and second bodies comprising: three spaced photodetectors arrays each comprising a multiplicity of photodetectors in a linear configuration fixed with respect to said first body; means fixed with respect to said second body for producing a single light beam which executes a cyclic sweeping motion about an axis defined within said second body, such that said light beam successively irradiates a selection of one or more photodetectors within each array during each cycle of its sweeping motion, the selection being dependent on said angular position; means attached to said second body for producing a time datum signal within each cycle of motion of said light beam; means for determining the locations within the arrays of the selected photodetectors, means for determining the timing of said irradiations with respect to said time datum signals; and means responsive to said locations and said timing to develop an output representative of the relative angular position of said first and second bodies.

2. A sensor according to claim 1 in which the sweeping motion is a rotational motion.

3. A sensor according to claim 1 in which the means for producing a time datum signal is a light detector lying in the path of the motion of the light beam.

4. A sensor according to claim 1 in which each photodetector comprises a photodiode.

5. A sensor according to claim 1 in which the means for determining the location comprises a respective storage means associated with each photodetector for storing a signal generated by the photodetector when irradiated; and means for sequentially reading the contents of the storage means to determine the location of the irradiated photodetector.

6. A sensor according to claim 1 in which the means for determining the relative timing comprises means associated with each photodetector effective to produce a strobe signal when the photodetector is irradiated, and means for comparing the time of production of the strobe pulse to that of a time datum signal.

7. A sensor according to claim 1 in which the first body is a vehicle framework, and the second body is a helmet worn by a passenger in the vehicle.

8. An angular position signalling arrangement for use in a system for sensing the relative angular position of a vehicle framework and a helmet worn by a passenger in the vehicle comprising: a light source mounted on the helmet and operative to produce a light beam which executes a cyclic sweeping motion about an axis of a reference frame defined in the helmet, and a means attached to the helmet for producing a time datum signal within each cycle of motion of the light beam when the light beam has a predetermined angular position with respect to the reference frame.

9. A signalling arrangement according to claim 8 in which the sweeping motion is a rotational motion.

10. A signalling arranement according to claim 8 in which the means for producing a time datum signal is a light detector lying in the path of the light beam.

11. A signalling arrangement according to claim 9 in which the rotational motion of the light beam is produced by a mirror rotating with respect to the light source.

12. An angular position sensor for sensing the relative angular position of first and second bodies comprising: three spaced linear photodetector arrays fixed with respect to said first body, said three arrays being substantially semicircular and centered about the same axis, two of the arrays having the same radius, and the third array being coplanar with one of said two arrays; means fixed with respect to said second body for producing a light beam which executes a cyclic sweeping motion about an axis defined within said second body, such that said light beam successively irradiates a photodetector within each array during each cycle of its sweeping motion; means attached to said second body for producing a time datum signal within each cycle of motion of said light beam; means for determining the locations within the arrays of the irradiated photodetectors; means for determining the timing of said irradiations with respect to said time datum signals; and means responsive to said locations and said timing to develop an output representative of the relative angular position of said first and second bodies.

* * * * *